United States Patent
Hoshino et al.

(10) Patent No.: US 9,694,348 B2
(45) Date of Patent: *Jul. 4, 2017

(54) EXHAUST CLEANING CATALYST

(71) Applicant: CATALER CORPORATION, Kakegawa-shi, Shizuoka (JP)

(72) Inventors: Sho Hoshino, Kakegawa (JP); Akimasa Hirai, Kakegawa (JP); Kenichi Taki, Kakegawa (JP); Satoshi Matsueda, Kakegawa (JP)

(73) Assignee: CATALER CORPORATION, Kakegawa-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/914,299

(22) PCT Filed: Dec. 9, 2014

(86) PCT No.: PCT/JP2014/082539
§ 371 (c)(1),
(2) Date: Feb. 25, 2016

(87) PCT Pub. No.: WO2015/087871
PCT Pub. Date: Jun. 18, 2015

(65) Prior Publication Data
US 2016/0199815 A1 Jul. 14, 2016

(30) Foreign Application Priority Data
Dec. 13, 2013 (JP) .................................. 2013-258650

(51) Int. Cl.
*B01J 23/10* (2006.01)
*B01J 23/40* (2006.01)
(Continued)

(52) U.S. Cl.
CPC ............ *B01J 23/63* (2013.01); *B01D 53/945* (2013.01); *B01J 23/002* (2013.01);
(Continued)

(58) Field of Classification Search
CPC ... B01J 23/10; B01J 23/40; B01J 23/42; B01J 23/44; B01J 23/46; B01J 23/63
(Continued)

(56) References Cited

U.S. PATENT DOCUMENTS

| | | | |
|---|---|---|---|
| 5,597,771 A * | 1/1997 | Hu | B01D 53/945 502/303 |
| 6,764,665 B2 * | 7/2004 | Deeba | B01D 53/865 423/213.5 |

(Continued)

FOREIGN PATENT DOCUMENTS

| | | |
|---|---|---|
| EP | 1 916 031 A1 | 4/2008 |
| JP | 2007-021456 A | 2/2007 |

(Continued)

OTHER PUBLICATIONS

Mar. 17, 2015 International Search Report issued in International Patent Application No. PCT/JP2014/082539.

*Primary Examiner* — Cam N. Nguyen
(74) *Attorney, Agent, or Firm* — Oliff PLC

(57) ABSTRACT

Provided is an exhaust catalyst that exhibits higher $NO_x$-reducing activities at the time of engine restart while maintaining its catalytic activities during normal traveling. This invention provides an exhaust cleaning catalyst comprising a substrate and a catalyst coating layer that includes $CeO_2$. Catalyst coating layer is constituted in its thickness direction with multiple coating layers. In a top coating layer located at the outermost surface, the $CeO_2$ content in a top coating layer's upstream portion is less than the $CeO_2$ content in a top coating layer's downstream portion; and the $CeO_2$
(Continued)

content in the top coating layer's upstream portion is less than the CeO$_2$ content in a lower coating layer. The CeO$_2$ content per liter of catalyst volume in the entire coating layer is 10 g/L to 30 g/L.

6 Claims, 3 Drawing Sheets

(51) Int. Cl.

| | | |
|---|---|---|
| B01J 23/42 | (2006.01) | |
| B01J 23/44 | (2006.01) | |
| B01J 23/46 | (2006.01) | |
| B01J 23/63 | (2006.01) | |
| B01J 23/00 | (2006.01) | |
| B01J 35/00 | (2006.01) | |
| B01D 53/94 | (2006.01) | |
| F01N 3/10 | (2006.01) | |

(52) U.S. Cl.
CPC ......... *B01J 35/0006* (2013.01); *B01J 35/006* (2013.01); *B01J 35/0013* (2013.01); *B01D 2255/1021* (2013.01); *B01D 2255/1023* (2013.01); *B01D 2255/1025* (2013.01); *B01D 2255/2065* (2013.01); *B01D 2255/407* (2013.01); *B01D 2255/902* (2013.01); *B01D 2255/908* (2013.01); *B01D 2255/9032* (2013.01); *B01D 2258/014* (2013.01); *B01J 2523/00* (2013.01); *F01N 3/101* (2013.01); *F01N 2510/0682* (2013.01); *F01N 2510/0684* (2013.01); *Y02T 10/22* (2013.01)

(58) Field of Classification Search
USPC ....... 502/304, 326, 327, 332–334, 339, 439, 502/527.12, 527.13
See application file for complete search history.

(56) References Cited

U.S. PATENT DOCUMENTS

| | | | | |
|---|---|---|---|---|
| 6,777,370 | B2* | 8/2004 | Chen | B01D 53/945 502/241 |
| 7,517,510 | B2* | 4/2009 | Chen | B01D 53/945 422/168 |
| 7,550,124 | B2* | 6/2009 | Chen | B01D 53/945 422/168 |
| 7,758,834 | B2* | 7/2010 | Chen | B01D 53/945 423/213.2 |
| 7,795,172 | B2* | 9/2010 | Foong | B01D 53/945 502/302 |
| 8,617,496 | B2* | 12/2013 | Wei | B01J 23/63 423/213.2 |
| 2003/0175192 | A1* | 9/2003 | Hu | B01D 53/8637 423/239.1 |
| 2008/0044330 | A1* | 2/2008 | Chen | B01D 53/945 423/213.5 |
| 2009/0124492 | A1 | 5/2009 | Kitamura et al. | |
| 2010/0061903 | A1 | 3/2010 | Kohara et al. | |
| 2010/0215557 | A1* | 8/2010 | Liu | B01D 53/945 423/213.5 |
| 2011/0041486 | A1 | 2/2011 | Kato et al. | |
| 2012/0283091 | A1 | 11/2012 | Sunada et al. | |

FOREIGN PATENT DOCUMENTS

| | | |
|---|---|---|
| JP | 2011-212639 A | 10/2011 |
| JP | 2012-040547 A | 3/2012 |

\* cited by examiner

EXHAUST CLEANING CATALYST

TECHNICAL FIELD

The present invention relates to an exhaust cleaning catalyst for cleaning exhaust expelled from an internal combustion engine.

The present application claims priority to Japanese Patent Application No. 2013-258650 filed on Dec. 13, 2013; and the entire contents of which are incorporated herein by reference.

BACKGROUND ART

In general, exhaust expelled from an engine of automobiles and the like comprises components such as hydrocarbons (HC), carbon monoxide (CO), nitrogen oxides ($NO_X$), etc. An exhaust cleaning catalyst to clean out these components from the exhaust is placed in the exhaust path from an internal combustion engine. Such exhaust cleaning catalyst is constructed with a catalyst coating layer formed on a substrate surface. The catalyst coating layer is constituted with a precious metal catalyst and a carrier that carries the precious metal catalyst.

For this type of exhaust cleaning catalyst (especially, gasoline engine exhaust cleaning catalyst), a so-called three-way catalyst is used. In the three-way catalyst, platinum (Pt), rhodium (Rh), palladium (Pd) and the like are used as precious metal catalysts. Among the precious metal catalysts, Pt and Pd contribute to the activity to clean (by oxidation) carbon hydrocarbons (HC) and carbon monoxide (CO) while Rh contributes to the activity to clean (by reduction) nitrogen oxides ($NO_X$).

The three-way catalyst is designed to effectively work in an exhaust gas atmosphere (or a "stoichiometric atmosphere" hereinafter) resulting from near-stoichiometric (theoretical) air-fuel ratio combustion. Thus, in richer exhaust (referring to exhaust generated from combustion of a rich air-fuel mixture) than this as well as in the opposite, lean exhaust (referring to exhaust generated from combustion of a lean air-fuel mixture), the activity of the three-way catalyst is lower than in the stoichiometric atmosphere.

Accordingly, to adjust (buffer) the atmosphere in the exhaust cleaning catalyst, as the carrier, an oxygen-storing/releasing material (or OSC (oxygen storage capacity) material hereinafter) comprising $CeO_2$ is used. The OSC material absorbs oxygen in oxygen-rich exhaust relative to the stoichiometric atmosphere (or a "lean atmosphere" hereinafter) and releases oxygen in exhaust generated from combustion of excess fuel with less oxygen (or a "rich atmosphere" hereinafter). Thus, it is effective in stably maintaining the exhaust in the catalyst as a stoichiometric atmosphere.

Examples of conventional art literatures related to such exhaust cleaning catalyst include Patent Documents 1 and 2. The exhaust cleaning catalyst according to Patent Document 1 is formed on a substrate and has a first catalyst coating layer that comprises precious metal catalysts such as Pt and Pd as well as an OSC material such as $CeO_2$. It also comprises a Rh-containing second catalyst coating layer in an area in the first catalyst coating layer. The first catalyst coating layer has a first-stage portion with a higher OSC content and a second-stage portion with a lower OSC content. According to Patent Document 1, an exhaust cleaning catalyst having such construction, great $NO_X$-reducing (cleaning) activities can be obtained during normal traveling.

CITATION LIST

Patent Literature

[Patent Document 1] Japanese Patent Application Publication No. 2011-212639
[Patent Document 2] Japanese Patent Application Publication No. 2012-40547

SUMMARY OF INVENTION

Lately, to increase fuel efficiency of vehicles such as automobiles, development is underway for so-call economical cars such as hybrid vehicles and idling stop (stop-start) vehicles having features that make engines stop while idling. In these economical cars, engines frequently shut off when the cars make temporary stops during traveling and while waiting for traffic lights to change. Because of this, the atmosphere in the exhaust cleaning catalyst tends to be lean. In other words, the OSC material in the catalyst may continue to stay in a state having oxygen stored therein.

Accordingly, when rich exhaust generated upon engine restart reaches the catalyst coating layer on the substrate, oxygen stored in the OSC material is supplied to the precious metal catalyst (PGM). As a result, the $NO_X$-reducing activity may decrease, leading to formation of emissions. Thus, from economic cars that make frequent engine stops and restarts during traveling (while in operation), higher $NO_X$-reducing (cleaning) activities at the time of engine restart are in demand.

The present invention has been made to solve the problem described above. An objective thereof is to provide an exhaust cleaning catalyst capable of maintaining its catalytic activities during normal traveling and of producing higher $NO_X$-reducing (cleaning) activities at the time of engine restart in an economic car that makes frequent engine stops and restarts.

Upon many earnest studies from various angles, the present inventors have made the present invention capable of achieving the objective.

The exhaust cleaning catalyst according to the present invention is placed in an exhaust path from an internal combustion engine and cleans exhaust expelled from the internal combustion engine. The exhaust cleaning catalyst comprises a porous substrate and a catalyst coating layer formed on the porous substrate. The catalyst coating layer has a carrier and a precious metal catalyst carried by the carrier. The carrier comprises an OSC material that includes at least $CeO_2$. The catalyst coating layer is constituted in its thickness direction with multiple coating layers that includes at least two layers having different compositions. Herein, it is characterized by that in its top coating layer forming the uppermost layer that is located at the outermost surface among the multiple coating layers, the $CeO_2$ content in a top coating layer's upstream portion that includes at least 20% of the full length of the top coating layer from the exhaust entrance-side end along the exhaust flow direction is less than the $CeO_2$ content in a top coating layer's downstream portion that includes at least 20% of the full length of the top coating layer from the exhaust exit-side end along the exhaust flow direction; and the $CeO_2$ content in the top coating layer's upstream portion is less than the $CeO_2$ content in a lower coating layer that is closer to the porous substrate than the top coating layer is among the multiple coating layers.

In the exhaust cleaning catalyst, the $CeO_2$ content in the top coating layer's upstream portion is less than the $CeO_2$ content in the top coating layer's downstream portion and in the lower coating layer. According to such constitution, the $CeO_2$-containing OSC material stores a smaller amount of oxygen in the top coating layer's upstream portion at the time of engine restart in an economic car that makes frequent engine stops and restarts during traveling. Accordingly, the exhaust air-fuel ratio in the top coating layer's upstream portion can reach a stoichiometric atmosphere (a stoichiometric air-fuel ratio) as soon as possible. $NO_X$ emissions can be thus reduced at the top coating layer's upstream portion at the time of engine restart.

According to the exhaust cleaning catalyst, the $CeO_2$ content in each of the top coating layer's downstream portion and the lower coating layer is greater than the $CeO_2$ content in the top coating layer's upstream portion. According to such constitution, because of the oxygen-releasing ability of $CeO_2$ (OSC material), the exhaust can be maintained as a stoichiometric atmosphere in the top coating layer's downstream portion and in the lower coating layer. Thus, in the top coating layer's downstream portion and in the lower coating layer, the $NO_X$-reducing (cleaning) activities can be maintained or increased during normal traveling.

From the above, according to the exhaust cleaning catalyst, while maintaining the catalytic activities during normal traveling, the $NO_X$-reducing (cleaning) activities can be increased at the time of engine restart in an economic car that makes frequent engine stops and restarts.

In a preferable embodiment of the exhaust cleaning catalyst of the present invention disclosed herein, the $CeO_2$ content per liter of catalyst volume in the entire catalyst coating layer is 10 g/L to 30 g/L. This can bring about preferable catalytic activities.

In another preferable embodiment of the exhaust cleaning catalyst of the present invention disclosed herein, the $CeO_2$ content in the top coating layer's upstream portion is 1/100 to 1/2 times the $CeO_2$ content in the top coating layer's downstream portion. By this, while the catalytic activities are preferably maintained in the top coating layer's downstream portion during normal traveling, the $NO_X$-reducing (cleaning) activities can be preferably increased at the time of engine restart in an economic car.

In another preferable embodiment of the exhaust cleaning catalyst of the present invention disclosed herein, the $CeO_2$ content per liter of catalyst volume in the top coating layer's upstream portion is 0.1 g/L to 2 g/L. By this, in the top coating layer's upstream portion, the $NO_X$-reducing (cleaning) activities can be preferably increased at the time of engine restart in an economic car and the like.

In another preferable embodiment of the exhaust cleaning catalyst of the present invention disclosed herein, with the full length of the top coating layer in the exhaust flow direction being 100, the (upstream/downstream) ratio of length of top coating layer's upstream portion along this direction to length of top coating layer's downstream portion along this direction is 20/80 to 75/25. By this, while reducing $NO_X$ emissions at the time of engine restart in an economic car and the like, the $NO_X$-cleaning activities can be preferably maintained or increased during normal traveling.

In another preferable embodiment of the exhaust cleaning catalyst of the present invention disclosed herein, the precious metal catalyst is at least one species of Pt, Pd or Rh. By the use of Pt and/or Pd with high oxidation catalytic activities as the precious metal catalyst, HC and CO in the exhaust can be preferably cleaned by oxidation. By the use of Rh with great reduction catalytic activities, $NO_X$ in the exhaust can be preferably cleaned by reduction.

In another preferable embodiment of the exhaust cleaning catalyst of the present invention disclosed herein, the top coating layer comprises Pd and Rh as the precious metal catalyst. According to such constitution, in the top coating layer, preferable three-way catalytic activities can be obtained. In other words, HC and CO in the exhaust can be cleaned by oxidation with Pd and $NO_X$ in the exhaust can be preferably cleaned by reduction with Rh.

DESCRIPTION OF EMBODIMENTS

Figure 1:
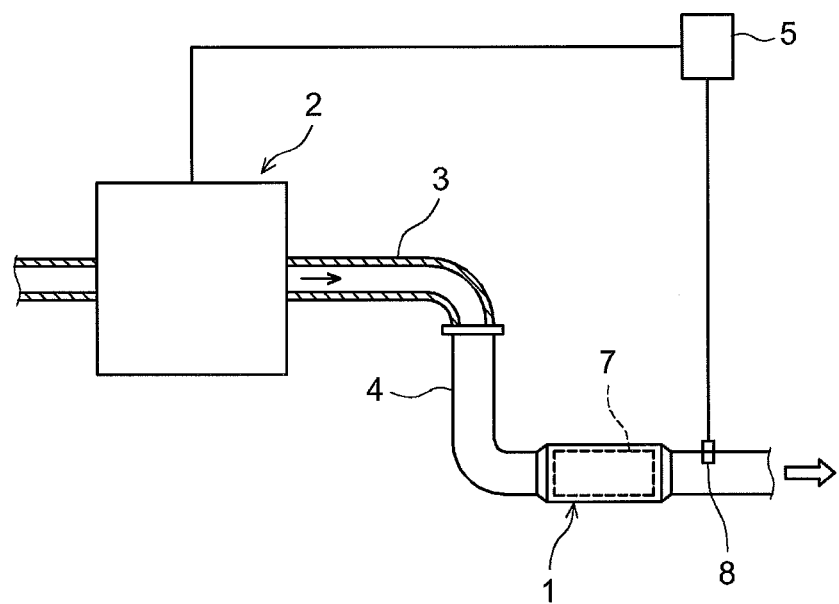
FIG. 1 shows a diagram schematically illustrating the exhaust cleaning system according to an embodiment.

Some embodiments of the present invention are described below with reference to drawings. In the drawings below, a common reference numeral may be assigned to members or sites producing the same effects, and duplicated descriptions are sometimes omitted or simplified. Dimensional relationships (length, width, thickness, etc.) in the respective drawings do not necessarily represent the accurate dimensional relationships. Matters necessary to practice this invention other than those specifically referred to in this description may be understood as design matters based on the conventional art in the pertinent field for a person of ordinary skill in the art. The present invention can be practiced based on the contents disclosed in this description and common technical knowledge in the subject field.

Described first is an exhaust cleaning system 1 having an exhaust cleaning catalyst 7 according to a typical embodiment of the present invention.

FIG. 1 shows a diagram schematically illustrating exhaust cleaning system 1 according to this embodiment. As shown in FIG. 1, exhaust cleaning system 1 is installed in an exhaust system of an internal combustion engine 2.

To internal combustion engine (engine) 2 according to this embodiment, a mixture comprising oxygen and fuel gas is supplied. Internal combustion engine 2 burns the gas mixture and converts combustion energy to mechanical energy. The gas mixture burned here produces exhaust which is released to the exhaust system. Internal combustion engine 2 constructed as shown in FIG. 1 primarily comprises an automobile gasoline engine. The exhaust cleaning catalyst 7 disclosed herein is installed downstream of internal combustion engine 2, especially in an economical car such as a passenger vehicle with an idling-stop function (i.e. an idling-stop vehicle) and a hybrid vehicle among automobiles. This type of vehicle makes frequent engine stops during traveling (and during a temporary stop) and thus is preferable for implementing the present invention.

Described next is the exhaust system of internal combustion engine 2. To an exhaust port (not shown in the drawing) which allows internal combustion engine 2 to communicate with the exhaust system, an exhaust manifold 3 is joined.

Exhaust manifold 3 is connected to an exhaust pipe 4 through which exhaust flows. Herein, exhaust manifold 3 and exhaust pipe 4 form the exhaust path in this embodiment. The arrow in the drawing indicates the direction of exhaust flow.

Exhaust cleaning system 1 cleans harmful components (e.g. carbon monoxide (CO), hydrocarbons (HC) and nitrogen oxides ($NO_X$)) in exhaust expelled from internal combustion engine 2. Herein, exhaust cleaning system 1 comprises an ECU 5 and an exhaust cleaning catalyst 7.

ECU 5 is an engine control unit that controls internal combustion engine 2 and exhaust cleaning system 1. Similarly to a general control system, ECU 5 comprises a digital computer and other electronics as components. Herein, ECU 5 is provided with input ports (not shown in the drawing) and is electrically connected to sensors (e.g. a pressure sensor 8) placed in internal combustion engine 2 and exhaust cleaning system 1, respectively. Because of this, information detected by the respective sensors is communicated as electrical signals via the input ports to ECU 5. ECU 5 is also provided with output ports (not shown in the drawing). ECU 5 is connected via the output ports to internal combustion engine 2 and exhaust cleaning system 1, respectively, and it controls the operation of the respective components by sending control signals.

Described next in detail is exhaust cleaning catalyst 7 suggested herein. Exhaust cleaning catalyst 7 is placed in the exhaust path of internal combustion engine 2 and cleans the exhaust expelled from internal combustion engine 2. Exhaust cleaning catalyst 7 is provided to exhaust pipe 4 through which the exhaust flows. In particular, exhaust cleaning catalyst 7 is provided on the downstream side of exhaust pipe 4 as shown in FIG. 1.

Figure 2:
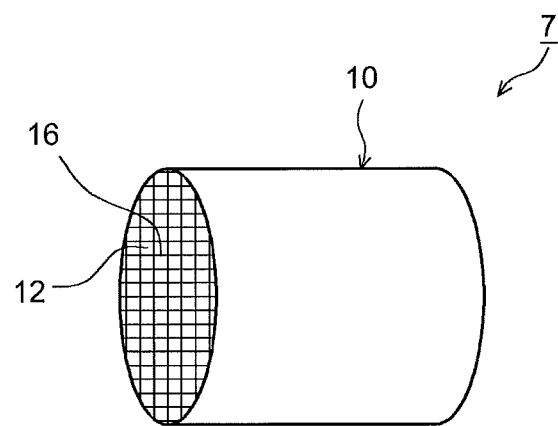
FIG. 2 shows a perspective view schematically illustrating a substrate for the exhaust cleaning catalyst.
Figure 3:
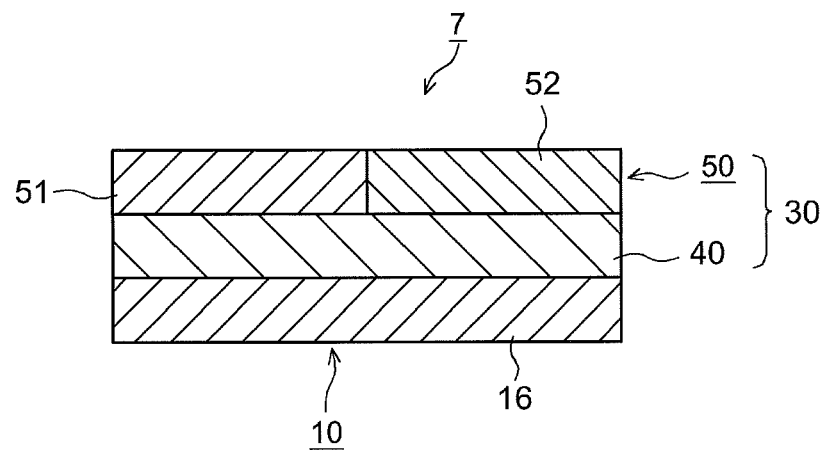
FIG. 3 shows a diagram schematically illustrating in large scale the cross-sectional construction of the exhaust cleaning catalyst according to an embodiment.

FIG. 2 shows a perspective view schematically illustrating a substrate 10 in exhaust cleaning catalyst 7. FIG. 3 shows a diagram schematically illustrating in enlarged scale the cross-sectional construction of exhaust cleaning catalyst 7. As shown in FIG. 2 and FIG. 3, exhaust cleaning catalyst 7 comprises substrate 10 and a catalyst coating layer 30.

<Substrate 10>

As shown in FIG. 2, substrate 10 is porous. For substrate 10, various forms of various materials conventionally used for this type of purpose can be used. Substrate 10 is preferably constituted with a heat-resistant material having a porous structure. Examples of such heat-resistant materials include cordierite, silicon carbide (SiC), aluminum titanate, silicon nitride, heat-resistant metals such as stainless steel and the like, and their alloys, etc. Herein, for example, substrate 10 is shown, having a cylindrical external shape in a honeycomb structure formed of regularly arranged cells (voids) 12 and cordierite partitions 16 separating the cells 12. The external shape of the entire substrate 10 is not particularly limited. An elliptic cylindrical shape, polygonal cylindrical shape, etc., can be adopted as well.

Substrate 10 has a volume (total cell volume, total bulk volume) of usually 0.1 L or greater (preferably 0.5 L or greater). For instance, it can be 5 L or less (preferably 3 L or less, more preferably 2 L or less, e.g. 1 L or less). Substrate 10 has a full length in the stretch direction (a full length in the exhaust flow direction) of usually about 10 mm to 500 mm (typically 50 mm to 300 mm, e.g. 100 mm to 200 mm).

<Catalyst Coating Layer 30>

Catalyst coating layer 30 is formed on substrate 10. In an example shown in FIG. 3, catalyst coating layer 30 is formed over partitions 16 that separate adjacent cells 12 (see FIG. 2). Catalyst coating layer 30 has a carrier and a precious metal catalyst carried by the carrier. Harmful components in the exhaust expelled from internal combustion engine 2 are cleaned upon making contact with catalyst coating layer 30. For example, CO and HC in the exhaust can be oxidized by catalyst coating layer 30 and converted (cleaned) to carbon dioxide ($CO_2$) and water (1120), etc. $NO_X$ can be reduced by catalyst coating layer 30 and converted (cleaned) to nitrogen ($N_2$).

Catalyst coating layer 30 comprises, as the carrier, an OSC material (oxygen storing/releasing material) comprising at least $CeO_2$. The $CeO_2$ content (OSC material) is able to store and release oxygen and thus can stably maintain the exhaust air-fuel ratio. The $CeO_2$-containing OSC material comprising is not particularly limited. For example, it can be ceria by itself or a ceria-zirconia composite oxide (CZ composite oxide) that comprises $CeO_2$ as a solid solution. From the standpoint of increasing the physical (mechanical) properties, a preferable OSC material is formed of a CZ composite oxide. The form (appearance) of the carrier is not particularly limited. It preferably has a form that yields a large specific surface area. For instance, the carrier has a specific surface area (determined by the BET method; the same applies hereinafter) of preferably 20 $m^2$/g to 100 $m^2$/g, or more preferably 40 $m^2$/g to 80 $m^2$/g. A form preferable for obtaining a carrier having such a specific surface area is a powder form (a particulate form). To obtain a carrier having a more preferable specific surface area, the CZ composite oxide in a powder form may have an average particle diameter (e.g. an average primary particle diameter based on SEM or TEM observations) of, for instance, 5 nm to 20 nm or preferably 7 nm to 12 nm. With the particles having an excessively large average particle diameter (or an excessively small specific surface area), when placing the precious metal catalyst over the carrier, the precious metal tends to be less dispersive, leading to lower cleaning activities of the catalyst. On the other hand, with the particles having an excessively small particle diameter (or an excessively large specific surface area), the heat resistance of the carrier itself may degrade, leading to lower heat resistance of the catalyst.

Catalyst coating layer 30 may have, as the carrier, another inorganic compound in combination with the $CeO_2$-containing OSC material (e.g. a CZ composite oxide). The other inorganic compound preferably has a relatively large specific surface area. Preferable examples include alumina ($Al_2O_3$), zirconia ($ZrO_2$), silica ($SiO_2$) and titania ($TiO_2$). From the standpoint of the heat resistance and structural stability, the carrier particles may have a specific surface area of about 20 $m^2$/g to 200 $m^2$/g. The carrier particles may have an average particle diameter (e.g. an average primary particle diameter based on SEM or TEM observations) of typically about 1 nm to 500 nm (e.g. 10 nm to 200 nm).

To the carrier of catalyst coating layer 30, other materials may be added as secondary components. Examples of the materials that can be added to the carrier include rare earth elements such as lanthanum (La) and yttrium (Y), alkaline earth metals such as calcium, and other transition metals, and the like. Among them, rare earth elements such as lanthanum and yttrium are preferable as stabilizing agents because they can increase the specific surface area at a high temperature without hindering the catalytic activities.

As the precious metal catalyst carried by the carrier in catalyst coating layer 30, at least one species of platinum (Pt), palladium (Pd) or rhodium (Rh) is preferable. For instance, a three-way catalyst comprising Pd and Rh is preferable. Catalyst coating layer 30 may comprise other precious metal catalyst(s) besides Pt, Pd and Rh constituting the three-way catalyst. Examples of the precious metal(s) other than Pt, Pd and Rh include ruthenium (Ru), iridium (Ir), osmium (Os), etc.

Catalyst coating layer 30 is constituted in its thickness direction with multiple coating layers that includes at least two layers having different compositions. In other words, the thickness of catalyst coating layer 30 is divided into multiple layers. In this embodiment, catalyst coating layer 30 is constituted with two layers, namely, a lower coating layer 40 and a top coating layer 50.

<Lower Coating Layer 40>

Among the multiple coating layers, lower coating layer 40 is closer to substrate 10 (typically to partitions 16) than top coating layer 50 is. Lower coating layer 40 is preferably formed on substrate 10. The average thickness of lower coating layer 40 is, but not particularly limited to, suitably about 5 μm to 500 μm, for instance, preferably about 50 μm to 200 μm. Lower coating layer 40 has, as the carrier, an OSC material (e.g. a CZ composite oxide) comprising $CeO_2$. The precious metal catalyst carried by the carrier in lower coating layer 40 is not particularly limited. For instance, as the precious metal catalyst, Pd, Pt, Rh and the like that form a three-way catalyst can be used. Herein, it preferably comprises an oxidation catalyst such as Pd. The precious metal catalyst (e.g. Pd) content per liter of catalyst volume in lower coating layer 40 can be generally 0.001 g/L to 4 g/L (typically 0.01 g/L to 2 g/L, e.g. 0.1 g/L to 1 g/L).

<Top Coating Layer 50>

Top coating layer 50 is the uppermost layer, that is, the layer located at the outermost surface among the multiple coating layers. When catalyst coating layer 30 has a two-layer structure such as in this embodiment, top coating layer 50 is formed on lower coating layer 40 formed over partitions 16. The average thickness of top coating layer 50 is, but not particularly limited to, suitably about 5 μm to 500 μm, or preferably, for instance, about 50 μm to 200 μm. Top coating layer 50 has a top coating layer's upstream portion 51 and a top coating layer's downstream portion 52.

The top coating layer's upstream portion 51 includes at least 20% of the full length of top coating layer 50 along the exhaust flow direction from the exhaust entrance-side end. Preferably, the top coating layer's upstream portion 51 accounts for 20% to 75% (e.g. 50%±10%) of the full length of top coating layer 50 along the flow direction from the exhaust entrance-side end.

The top coating layer's downstream portion 52 includes at least 20% of the full length of top coating layer 50 along the exhaust flow direction from the exhaust exit-side end. Preferably, the top coating layer's downstream portion 51 accounts for 25% to 80% (e.g. 50%±10%) of the full length of top coating layer 50 along the flow direction from the exhaust exit-side end.

With the full length of top coating layer 50 in the exhaust flow direction being 100, the (upstream/downstream) ratio of length of top coating layer's upstream portion along this direction to length of top coating layer's downstream portion along this direction is preferably 20/80 to 75/25, or typically preferably 40/60 to 60/40.

The precious metal catalyst carried by the carrier in top coating layer 50 (top coating layer's upstream portion 51 and top coating layer's downstream portion 52) is not particularly limited. For instance, Pd, Pt, Rh and the like that form a three-way catalyst can be used. Herein, as the precious metal catalyst, Pt or Pd which is highly active in oxidation and Rh which is highly active in reduction are preferably contained. The precious metal catalyst (e.g. Pd) content per liter of catalyst volume in top coating layer 50 can be generally 0.001 g/L to 10 g/L (typically 0.01 g/L to 5 g/L). Herein, the precious metal catalyst (e.g. Pd) content per liter of catalyst volume in each of the top coating layer's upstream portion 51 and top coating layer's downstream portion 52 can be generally 0.001 g/L to 10 g/L (preferably 0.01 g/L to 2.5 g/L). When a catalyst highly active in reduction such as Rh is included in addition to a catalyst highly active in oxidation such as Pd, the reduction catalyst (e.g. Rh) content per liter of catalyst volume in top coating layer 50 can be generally 0.001 g/L to 10 g/L (typically 0.01 g/L to 5 g/L).

<$CeO_2$ Content>

Described next is the $CeO_2$ content as the OSC material in catalyst coating layer 30. The $CeO_2$ content per liter of catalyst volume in catalyst coating layer 30 is preferably about 10 g/L to 30 g/L, or more preferably about 15 g/L to 20 g/L. In this invention, the $CeO_2$ content in the top coating layer's upstream portion 51 is less than the $CeO_2$ content in the top coating layer's downstream portion 52 and the $CeO_2$ content in the lower coating layer 40. In other words, the $CeO_2$ content in the top coating layer's downstream portion 52 and the $CeO_2$ content in the lower coating layer 40 are greater than the $CeO_2$ content in the top coating layer's upstream portion 51.

In this embodiment, the $CeO_2$ content per liter of catalyst volume in the top coating layer's upstream portion 51 is about 0.1 g/L to 2 g/L, or preferably, for instance, about 0.5 g/L to 1.5 g/L. The $CeO_2$ content in the top coating layer's upstream portion 51 is about 1/100 to 1/2 times—for instance, preferably about 1/50 to 1/2 times—the $CeO_2$ content in the top coating layer's downstream portion 52. In other words, the $CeO_2$ content in the top coating layer's downstream portion 52 is about 2 to 100 times—for instance, preferably about 2 to 50 times—the $CeO_2$ content in the top coating layer's upstream portion 51. In this case, the $CeO_2$ content in the top coating layer's downstream portion 52 is preferably selected so that the $CeO_2$ content per liter of catalyst volume in catalyst coating layer 30 is 10 g/L to 30 g/L. That is, depending on the $CeO_2$ content in the top coating layer's upstream portion 51, the upper limit of the aforementioned range may be lower. For example, when the $CeO_2$ content per liter of catalyst volume in the top coating layer's upstream portion 51 is 2 g/L, the $CeO_2$ content in the top coating layer's downstream portion 52 is preferably about 2 to 14 times the $CeO_2$ content in the top coating layer's upstream portion 51.

The $CeO_2$ content per liter of catalyst volume in the lower coating layer 40 can be, but not particularly limited to, preferably 0.1 g/L to 15 g/L, or more preferably 0.4 g/L to 14 g/L, for instance, 10 g/L. The $CeO_2$ content per in the lower coating layer 40 is preferably selected so that the $CeO_2$ content per liter of catalyst volume in the entire catalyst coating layer 30 is 10 g/L to 30 g/L.

In an economic car installed with the exhaust cleaning catalyst 7 disclosed herein, the engine makes frequent stops during traveling (and during a temporary stop), the atmosphere in exhaust cleaning catalyst 7 tends to be lean. Accordingly, in this embodiment, the $CeO_2$ content per liter of catalyst volume in the top coating layer's upstream portion 51 is about 0.1 g/L to 2 g/L. In other words, the $CeO_2$ content in the top coating layer's upstream portion 51 is less than the $CeO_2$ content in the top coating layer's downstream portion 52 and in lower coating layer 40. Because of this, at the time of engine restart, a smaller amount of oxygen is stored in the $CeO_2$; and therefore, the catalyst can be quickly filled with a stoichiometric atmosphere. Thus, even at the time of engine restart in an economic car, $NO_X$ emissions can be quickly reduced in the top coating layer's upstream portion 51.

On the other hand, the $CeO_2$ content in the top coating layer's downstream portion 52 and in lower coating layer 40 is greater than the $CeO_2$ content in the top coating layer's upstream portion 51. In particular, the $CeO_2$ content in the top coating layer's downstream portion 52 is about 2 to 100 times the $CeO_2$ content in the top coating layer's upstream portion 51. According to such constitution, during normal traveling, by the oxygen-storing/releasing abilities of $CeO_2$ in the top coating layer's downstream portion 52 and in lower coating layer 40, the exhaust drawn into the catalyst can be maintained as a stoichiometric atmosphere. As a result, the $NO_X$-reducing (cleaning) activities can be maintained during normal traveling. Thus, according to the exhaust cleaning catalyst 7 disclosed herein, while maintaining the catalytic activities during normal traveling, increased $NO_X$-reducing (cleaning) activities can be obtained at the time of engine restart.

Figure 4:
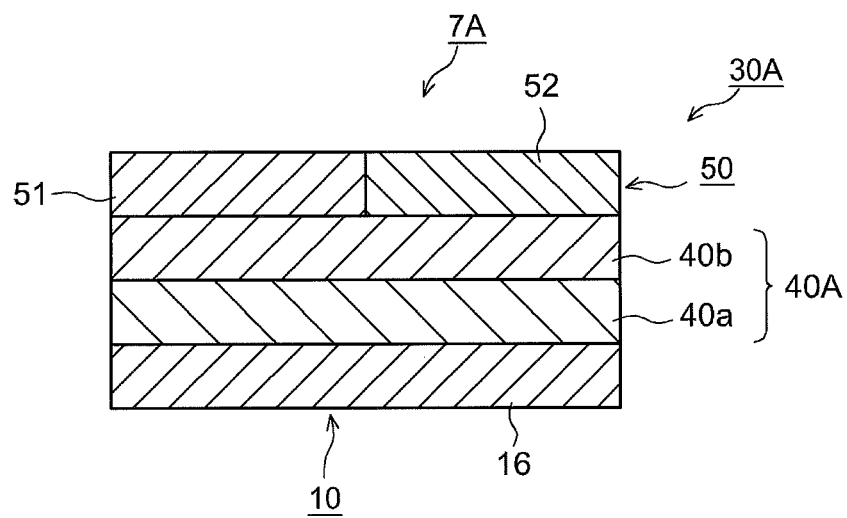
FIG. 4 shows a diagram schematically illustrating in large scale the cross-sectional construction of the exhaust cleaning catalyst according to another embodiment.

Exhaust cleaning catalyst 7 according to a preferable embodiment of the present invention is described above. The exhaust cleaning catalyst according to this invention is, however, not limited to this embodiment. For instance, as for another embodiment, it can be an exhaust cleaning catalyst 7A as shown in FIG. 4. As shown in FIG. 4, exhaust cleaning catalyst 7A according to this embodiment has a catalyst coating layer 30A having a three-layer (or more multiple-layer) structure.

In other words, as shown in FIG. 4, catalyst coating layer 30A according to this embodiment comprises a lower coating layer 40A and a top coating layer 50. The lower coating layer 40A comprises a bottom coating layer 40a near substrate 10 (typically partitions 16) and a middle coating layer 40b formed between the bottom coating layer 40a and top coating layer 50.

The bottom coating layer 40a and middle coating layer 40b may preferably comprise an OSC material having at least $CeO_2$. The $CeO_2$ is preferably present, for instance, as a CZ composite oxide. The $CeO_2$ content as the carrier in bottom coating layer 40a and in middle coating layer 40b is not particularly limited. In an embodiment, the $CeO_2$ content per liter of catalyst volume in catalyst coating layer 30A—that is, the total $CeO_2$ content of the lower coating layer 40A (the bottom coating layer 40a and middle coating layer 40b) and top coating layer 50 combined—is preferably about 10 g/L to 30 g/L.

The precious metal catalyst carried in the bottom coating layer 40a and middle coating layer 40b is, for instance, but not particularly limited to, Pt, Pd, Rh and the like that form a three-way catalyst.

Described next are some tested examples related to the present invention. However, the exhaust cleaning catalyst according to this invention is not to be limited to the tested examples shown below. Herein, as tested examples, catalyst samples were obtained for exhaust cleaning catalysts according to Examples 1 to 23. The catalyst samples of the respective examples are described below.

EXAMPLE 1

The exhaust cleaning catalyst of Example 1 has a two-layer structure.

First, a substrate was obtained, having 600 cpsi (cells per square inch), a volume (referring to the entire catalyst volume including the volume of the cell aisles) of 1 L and a full length of 100 mm.

To 300 g of ion-exchanged water, were mixed 50 g of a CZ composite oxide mixed with $La_2O_3$ and $Nd_2O_3$ as a carrier ($CeO_2$:$ZrO_2$:$La_2O_3$:$Nd_2O_3$=20:70:5:5 (% by weight)) ($CeO_2$ content: 10 g), 50 g of alumina and a palladium nitrate solution with 0.5 g of palladium. The resulting mixture was subjected to wet milling in a ball mill to prepare a lower coating layer slurry.

To 300 g of ion-exchanged water, were mixed 3.75 g of a CZ composite oxide mixed with $La_2O_3$ and $Y_2O_3$ as a carrier ($CeO_2$:$ZrO_2$:$La_2O_3$:$Y_2O_3$=40:50:8:2 (% by weight)) ($CeO_2$ content: 1.5 g), 46.25 g of alumina, a palladium nitrate solution with 1.5 g of palladium and a rhodium nitrate solution with 0.1 g of rhodium. The resulting mixture was subjected to wet milling in a ball mill to prepare a top coating layer's upstream portion slurry.

To 300 g of ion-exchanged water, were mixed 12.5 g of a CZ composite oxide mixed with $La_2O_3$ and $Y_2O_3$ as a carrier ($CeO_2$:$ZrO_2$:$La_2O_3$:$Y_2O_3$=40:50:8:2 (% by weight)) ($CeO_2$ content: 5 g), 37.5 g of alumina, a palladium nitrate solution with 1.5 g of palladium and a rhodium nitrate solution with 0.1 g of rhodium. The resulting mixture was subjected to wet milling in a ball mill to prepare a top coating layer's downstream portion slurry.

Subsequently, the whole amount of the lower coating layer slurry was applied all over a substrate, allowed to dry at a temperature of 250° C. for one hour, and calcined at a temperature of 500° C. for one hour to form a lower coating layer on the substrate.

The whole amount of the top coating layer's upstream portion slurry was applied to an area of the substrate up to 50 mm from its exhaust entrance-side end towards its exhaust exit-side end, allowed to dry at a temperature of 250° C. for one hour, and calcined at a temperature of 500° C. for one hour to form a top coating layer's upstream portion on the substrate.

The whole amount of the top coating layer's downstream portion slurry was applied to an area of the substrate up to 50 mm from its exhaust exit-side end towards its exhaust entrance-side end, allowed to dry at a temperature of 250° C. for one hour, and calcined at a temperature of 500° C. for one hour to form a top coating layer's downstream portion on the substrate.

The exhaust cleaning catalyst thus obtained was used as a catalyst sample of Example 1.

EXAMPLE 2

The procedure for fabricating the exhaust cleaning catalyst in Example 1 was carried out in the same manner as Example 1 except for the following and the resulting exhaust cleaning catalyst was used as a catalyst sample of Example 2:

In the step of preparing the lower coating layer slurry, 21.5 g of the CZ composite oxide ($CeO_2$ content: 4.3 g) and 78.5 g of alumina were used.

In the step of preparing the top coating layer's downstream portion slurry, 10.75 g of the CZ composite oxide ($CeO_2$ content: 4.3 g) and 39.25 g of alumina were used.

EXAMPLE 3

The procedure for fabricating the exhaust cleaning catalyst in Example 1 was carried out in the same manner as Example 1 except for the following and the resulting exhaust cleaning catalyst was used as a catalyst sample of Example 3.

In the step of preparing the lower coating layer slurry, 70 g of the CZ composite oxide ($CeO_2$ content: 14 g) and 30 g of alumina were used.

In the step of preparing the top coating layer's downstream portion slurry, 35 g of the CZ composite oxide ($CeO_2$ content: 14 g) and 15 g of alumina were used.

EXAMPLE 4

The procedure for fabricating the exhaust cleaning catalyst in Example 1 was carried out in the same manner as Example 1 except for the following and the resulting exhaust cleaning catalyst was used as a catalyst sample of Example 4.

In the step of preparing the top coating layer's upstream portion slurry, 0.25 g of the CZ composite oxide ($CeO_2$ content: 0.1 g) and 49.75 g of alumina were used.

In the step of preparing the top coating layer's downstream portion slurry, 25 g of the CZ composite oxide ($CeO_2$ content: 10 g) and 25 g of alumina were used.

EXAMPLE 5

In the step of preparing the top coating layer's downstream portion slurry in Example 1, 7.5 g of the CZ composite oxide ($CeO_2$ content: 3 g) and 42.5 g of alumina were used. Otherwise, in the same manner as Example 1, an exhaust cleaning catalyst was fabricated and this was used as a catalyst sample of Example 5.

EXAMPLE 6

In the step of preparing the top coating layer's upstream portion slurry in Example 1, 0.25 g of the CZ composite oxide ($CeO_2$ content: 0.1 g) and 49.75 g of alumina were used. Otherwise, in the same manner as Example 1, an exhaust cleaning catalyst was fabricated and this was used as a catalyst sample of Example 6.

EXAMPLE 7

In the step of preparing the top coating layer's upstream portion slurry in Example 1, 5 g of the CZ composite oxide ($CeO_2$ content: 2 g) and 45 g of alumina were used. Otherwise, in the same manner as Example 1, an exhaust cleaning catalyst was fabricated and this was used as a catalyst sample of Example 7.

EXAMPLE 8

The procedure for fabricating the exhaust cleaning catalyst in Example 1 was carried out in the same manner as Example 1 except for the following and the resulting exhaust cleaning catalyst was used as a catalyst sample of Example 8.

The whole amount of the top coating layer's upstream portion slurry was applied to an area of the substrate up to 20 mm from its exhaust entrance-side end towards its exhaust exit-side end.

The whole amount of the top coating layer's downstream portion slurry was applied to an area of the substrate up to 80 mm from its exhaust exit-side end towards its exhaust entrance-side end.

EXAMPLE 9

The procedure for fabricating the exhaust cleaning catalyst in Example 1 was carried out in the same manner as Example 1 except for the following and the resulting exhaust cleaning catalyst was used as a catalyst sample of Example 9.

The whole amount of the top coating layer's upstream portion slurry was applied to an area of the substrate up to 75 mm from its exhaust entrance-side end towards its exhaust exit-side end.

The whole amount of the top coating layer's downstream portion slurry was applied to an area of the substrate up to 25 mm from its exhaust exit-side end towards its exhaust entrance-side end.

EXAMPLE 10

In the step of preparing the lower coating layer slurry in Example 1, the palladium content in the palladium nitrate solution oxide was 0.3 g and a platinum chloride solution with 0.2 g of platinum was further mixed in. Otherwise, in the same manner as Example 1, an exhaust cleaning catalyst was fabricated and this was used as a catalyst sample of Example 10.

EXAMPLE 11

The exhaust cleaning catalyst of Example 11 has a three-layer structure.

First, as a substrate, the same substrate as the cordierite substrate of Example 1 was obtained.

To 300 g of ion-exchanged water, were mixed 50 g of a CZ composite oxide mixed with $La_2O_3$ and $Nd_2O_3$ as a carrier ($CeO_2:ZrO_2:La_2O_3:Nd_2O_3=20:70:5:5$ (% by weight)) ($CeO_2$ content: 10 g), 50 g of alumina and a palladium nitrate solution with 0.5 g of palladium. The resulting mixture was subjected to wet milling in a ball mill to prepare a bottom coating layer slurry.

To 300 g of ion-exchanged water, were mixed 25 g of a CZ composite oxide ($CeO_2:ZrO_2:La_2O_3:Nd_2O_3=20:70:5:5$ (% by weight)) ($CeO_2$ content: 5 g) comprising a mixture of $La_2O_3$ and $Nd_2O_3$ as a carrier, 25 g of alumina and a rhodium nitrate solution with 0.1 g of rhodium. The resulting mixture was subjected to wet milling in a ball mill to prepare a middle coating layer slurry.

To 300 g of ion-exchanged water, were mixed 3.75 g of a CZ composite oxide mixed with $La_2O_3$ and $Y_2O_3$ as a carrier ($CeO_2:ZrO_2:La_2O_3:Y_2O_3=40:50:8:2$ (% by weight)) ($CeO_2$ content: 1.5 g), 46.25 g of alumina, a palladium nitrate solution with 1.5 g of palladium and a rhodium nitrate solution with 0.1 g of rhodium. The resulting mixture was subjected to wet milling in a ball mill to prepare a top coating layer's upstream portion slurry.

To 300 g of ion-exchanged water, were mixed 12.5 g of a CZ composite oxide mixed with $La_2O_3$ and $Y_2O_3$ as a carrier ($CeO_2:ZrO_2:La_2O_3:Y_2O_3=40:50:8:2$ (% by weight)) ($CeO_2$ content: 5 g), 37.5 g of alumina, a palladium nitrate solution with 1.5 g of palladium and a rhodium nitrate solution with 0.1 g of rhodium. The resulting mixture was subjected to wet milling in a ball mill to prepare a top coating layer's downstream portion slurry.

Subsequently, the whole amount of the bottom coating layer slurry was applied all over a substrate, allowed to dry at a temperature of 250° C. for one hour, and calcined at a temperature of 500° C. for one hour to form a bottom coating layer on the substrate.

The whole amount of the middle coating layer slurry was applied all over the substrate, allowed to dry at a temperature of 250° C. for one hour, and calcined at a temperature of 500° C. for one hour to form a middle coating layer over the substrate.

The whole amount of the top coating layer's upstream portion slurry was applied to an area of the substrate up to 50 mm from its exhaust entrance-side end towards its exhaust exit-side end, allowed to dry at a temperature of 250° C. for one hour, and calcined at a temperature of 500° C. for one hour to form a top coating layer's upstream portion on the substrate.

The whole amount of the top coating layer's downstream portion slurry was applied to an area of the substrate up to 50 mm from its exhaust exit-side end towards its exhaust entrance-side end, allowed to dry at a temperature of 250° C. for one hour, and calcined at a temperature of 500° C. for one hour to form a top coating layer's downstream portion on the substrate.

The exhaust cleaning catalyst thus obtained was used as a catalyst sample of Example 11.

EXAMPLE 12

In the step of preparing the lower coating layer slurry in Example 1, 10 g of the CZ composite oxide ($CeO_2$ content: 2 g) and 90 g of alumina were used. Otherwise, in the same manner as Example 1, an exhaust cleaning catalyst was fabricated and this was used as a catalyst sample of Example 12.

EXAMPLE 13

In the step of preparing the lower coating layer slurry in Example 1, 125 g of the CZ composite oxide ($CeO_2$ content: 25 g) was used, and no alumina was used. Otherwise, in the same manner as Example 1, an exhaust cleaning catalyst was fabricated and this was used as a catalyst sample of Example 13.

EXAMPLE 14

The procedure for fabricating the exhaust cleaning catalyst in Example 1 was carried out in the same manner as Example 1 except for the following and the resulting exhaust cleaning catalyst was used as a catalyst sample of Example 14.
  In the step of preparing the top coating layer's upstream portion slurry, 12.5 g of the CZ composite oxide ($CeO_2$ content: 5 g) and 37.5 g of alumina were used.
  In the step of preparing the top coating layer's downstream portion slurry, 3.75 g of the CZ composite oxide ($CeO_2$ content: 1.5 g) and 46.25 g of alumina were used.

EXAMPLE 15

The procedure for fabricating the exhaust cleaning catalyst in Example 1 was carried out in the same manner as Example 1 except for the following and the resulting exhaust cleaning catalyst was used as a catalyst sample of Example 15.
  In the step of preparing the lower coating layer slurry, 7.5 g of the CZ composite oxide ($CeO_2$ content: 1.5 g) and 92.5 g of alumina were used.
  In the step of preparing the top coating layer's upstream portion slurry, 12.5 g of the CZ composite oxide ($CeO_2$ content: 5 g) and 37.5 g of alumina were used.
  In the step of preparing the top coating layer's downstream portion slurry, 25 g of the CZ composite oxide ($CeO_2$ content: 10 g) and 25 g of alumina were used.

EXAMPLE 16

The procedure for fabricating the exhaust cleaning catalyst in Example 1 was carried out in the same manner as Example 1 except for the following and the resulting exhaust cleaning catalyst was used as a catalyst sample of Example 16.
  In the step of preparing the top coating layer's upstream portion slurry, 0.25 g of the CZ composite oxide ($CeO_2$ content: 0.1 g) and 49.25 g of alumina were used.
  In the step of preparing the top coating layer's downstream portion slurry, 37.5 g of the CZ composite oxide ($CeO_2$ content: 15 g) and 12.5 g of alumina were used.

EXAMPLE 17

In the step of preparing the top coating layer's downstream portion slurry in Example 1, 3.75 g of the CZ composite oxide ($CeO_2$ content: 1.5 g) and 46.25 g of alumina were used. Otherwise, in the same manner as Example 1, an exhaust cleaning catalyst was fabricated and this was used as a catalyst sample of Example 17.

EXAMPLE 18

In the step of preparing the top coating layer's downstream portion slurry in Example 1, no CZ composite oxide was used and 50 g of alumina was used. Otherwise, in the same manner as Example 1, an exhaust cleaning catalyst was fabricated and this was used as a catalyst sample of Example 18.

EXAMPLE 19

In the step of preparing the top coating layer's downstream portion slurry in Example 1, 10 g of the CZ composite oxide ($CeO_2$ content: 4 g) and 40 g of alumina were used. Otherwise, in the same manner as Example 1, an exhaust cleaning catalyst was fabricated and this was used as a catalyst sample of Example 19.

EXAMPLE 20

The procedure for fabricating the exhaust cleaning catalyst in Example 1 was carried out in the same manner as Example 1 except for the following and the resulting exhaust cleaning catalyst was used as a catalyst sample of Example 20.
  The whole amount of the top coating layer's upstream portion slurry was applied to an area of the substrate up to 15 mm from its exhaust entrance-side end towards its exhaust exit-side end.
  The whole amount of the top coating layer's downstream portion slurry was applied to an area of the substrate up to 85 mm from its exhaust exit-side end towards its exhaust entrance-side end.

EXAMPLE 21

The procedure for fabricating the exhaust cleaning catalyst in Example 1 was carried out in the same manner as Example 1 except for the following and the resulting exhaust cleaning catalyst was used as a catalyst sample of Example 21.

The whole amount of the top coating layer's upstream portion slurry was applied to an area of the substrate up to 80 mm from its exhaust entrance-side end towards its exhaust exit-side end.

The whole amount of the top coating layer's downstream portion slurry was applied to an area of the substrate up to 20 mm from its exhaust exit-side end towards its exhaust entrance-side end.

EXAMPLE 22

In the step of preparing the lower coating layer slurry in Example 12, the palladium content in the palladium nitrate solution was 0.3 g and a platinum chloride solution with 0.2 g of platinum was further mixed. Otherwise, in the same manner as Example 1, an exhaust cleaning catalyst was fabricated and this was used as a catalyst sample of Example 22.

EXAMPLE 23

The exhaust cleaning catalyst of Example 23 has a three-layer structure. In Example 23, in the step of preparing the bottom coating layer slurry in Example 11, 125 g of the CZ composite oxide ($CeO_2$ content: 25 g) was used and no alumina was used. Otherwise in the same manner as Example 11, an exhaust cleaning catalyst was fabricated and this was used as a catalyst sample of Example 23.

Table 1 shows the summary of the catalyst samples of the exhaust cleaning catalysts in Examples 1 to 23. In Table 1, the $CeO_2$ content is per liter of catalyst volume and the unit is g/L. In each catalyst sample, the total $CeO_2$ content of the catalyst coating layer indicates the total of the $CeO_2$ content in the top coating layer's upstream and downstream portions and the lower coating layer (the bottom coating layer and middle coating layer in Examples 11 and 23) combined.

TABLE 1

| | $CeO_2$ content in catalyst coating layer (g/L) | | | | Length of top coating layer (%) | |
|---|---|---|---|---|---|---|
| | Top coating layer upstream portion | Top coating layer downstream portion | Lower coating layer (Bottom coating layer) | Total | Top coating layer upstream portion | Top coating layer downstream portion |
| Ex. 1 | 1.5 | 5.0 | 10.0 | 16.5 | 50 | 50 |
| Ex. 2 | 1.5 | 4.3 | 4.3 | 10.1 | 50 | 50 |
| Ex. 3 | 1.5 | 14.0 | 14.0 | 29.5 | 50 | 50 |
| Ex. 4 | 0.1 | 10.0 | 10.0 | 20.1 | 50 | 50 |
| Ex. 5 | 1.5 | 3.0 | 10.0 | 14.5 | 50 | 50 |
| Ex. 6 | 0.1 | 5.0 | 10.0 | 15.1 | 50 | 50 |
| Ex. 7 | 2.0 | 5.0 | 10.0 | 17.0 | 50 | 50 |
| Ex. 8 | 1.5 | 5.0 | 10.0 | 16.5 | 20 | 80 |
| Ex. 9 | 1.5 | 5.0 | 10.0 | 16.5 | 75 | 25 |
| Ex. 10 | 1.5 | 5.0 | 10.0 | 16.5 | 50 | 50 |
| Ex. 11 | 1.5 | 5.0 | 10.0 | 21.5 | 50 | 50 |
| Ex. 12 | 1.5 | 5.0 | 2.0 | 8.5 | 50 | 50 |
| Ex. 13 | 1.5 | 5.0 | 25.0 | 31.5 | 50 | 50 |
| Ex. 14 | 5.0 | 1.5 | 10.0 | 16.5 | 50 | 50 |
| Ex. 15 | 5.0 | 10.0 | 1.5 | 16.5 | 50 | 50 |
| Ex. 16 | 0.1 | 15.0 | 10.0 | 25.1 | 50 | 50 |
| Ex. 17 | 1.5 | 1.5 | 10.0 | 13.0 | 50 | 50 |
| Ex. 18 | 0.0 | 5.0 | 10.0 | 15.0 | 50 | 50 |
| Ex. 19 | 4.0 | 5.0 | 10.0 | 19.0 | 50 | 50 |
| Ex. 20 | 1.5 | 5.0 | 10.0 | 16.5 | 15 | 85 |
| Ex. 21 | 1.5 | 5.0 | 10.0 | 16.5 | 80 | 20 |
| Ex. 22 | 1.5 | 5.0 | 2.0 | 8.5 | 50 | 50 |
| Ex. 23 | 1.5 | 5.0 | 25.0 | 36.5 | 50 | 50 |

[Evaluations]

After enduring an approximately 100,000 km drive, each catalyst sample of the exhaust cleaning catalysts according to Example 1 to Example 23 was installed in an idling-stop vehicle having an engine with 1.2 L displacement. The vehicle installed with the catalyst sample was driven in JC08 mode. The total amount of $NO_X$ emissions in each catalyst sample during the drive was measured. From the total amount of $NO_X$ emissions, the amount of $NO_X$ emissions at the time of engine restart and the amount of $NO_X$ emissions during the rest of the time not involving an engine restart were determined.

Figure 5:
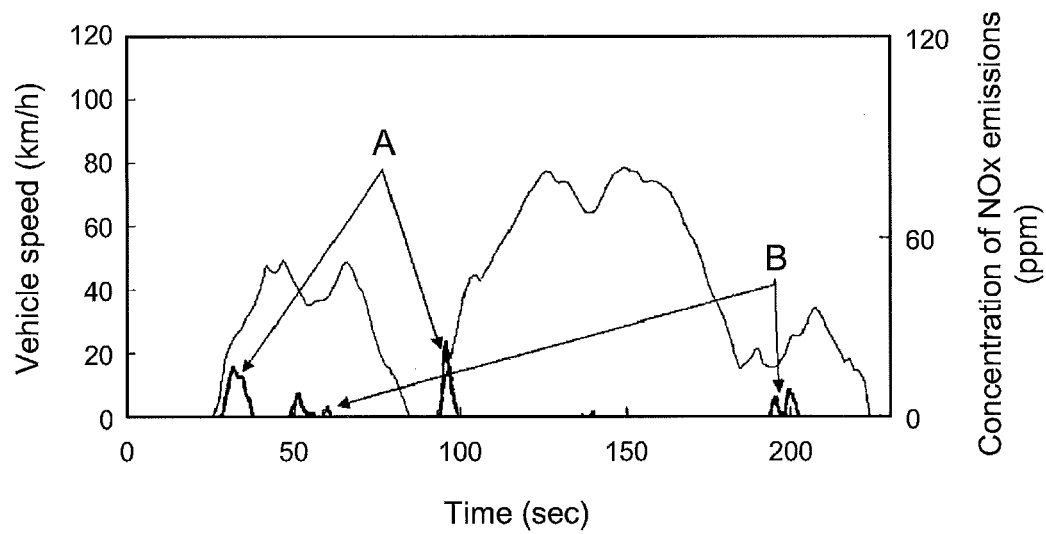
FIG. 5 shows a graph showing an example of the traveling mode and the concentration of $NO_X$ emissions by CVS in an evaluation test in a tested example.

For the total amount of $NO_X$ emissions, the total $NO_X$ emission value (mg/km) was used. The traveling (driving) mode was then divided into engine restart periods and other periods free of an engine restart. FIG. 5 shows a graph of an example of the traveling mode and concentration of $NO_X$ emissions by CVS in the evaluation test with respect to a tested example. FIG. 5 shows vehicle speeds (km/h) versus elapsed time (sec). FIG. 5 also shows concentrations of $NO_X$ emissions (ppm) by CVS versus elapsed time (sec). For instance, in a traveling mode as shown in FIG. 5, an engine restart period is a period during which an engine (at 0 km/h in vehicle speed) starts from a stopped state and continues to accelerate without decelerating. The integral is taken of the concentration of $NO_X$ emissions in the period (the concentration A of $NO_X$ emissions in FIG. 5) measured with a system called CVS (constant volume sampler). The other periods are treated as engine restart-free periods; and the integral is taken of the concentration of $NO_X$ emissions by CVS (of the concentration B of $NO_X$ emissions in FIG. 5) in these periods. In accordance with the ratio of integral of concentration of $NO_X$ emissions in engine restart periods to integral of concentration of $NO_X$ emissions in engine restart-free periods, the total $NO_X$ emission value was divided into the $NO_X$ emissions at the time of engine restart and $NO_X$ emissions at the rest of the time not involving an engine restart. Table 2 shows the respective $NO_X$ emissions in Examples 1 to 23.

TABLE 2

| | NOx emissions (mg/km) | | |
|---|---|---|---|
| | At restart | Rest | Total |
| Ex. 1 | 1.2 | 1.5 | 2.7 |
| Ex. 2 | 1.2 | 2.7 | 3.9 |
| Ex. 3 | 1.9 | 1.5 | 3.4 |
| Ex. 4 | 1.5 | 1.6 | 3.1 |
| Ex. 5 | 1.1 | 2.0 | 3.1 |
| Ex. 6 | 1.1 | 2.0 | 3.1 |
| Ex. 7 | 1.5 | 1.4 | 2.9 |
| Ex. 8 | 1.6 | 2.2 | 3.8 |
| Ex. 9 | 1.4 | 2.3 | 3.7 |
| Ex. 10 | 1.2 | 1.7 | 2.9 |
| Ex. 11 | 1.4 | 1.4 | 2.8 |
| Ex. 12 | 1.8 | 4.5 | 6.3 |
| Ex. 13 | 4.9 | 1.7 | 6.6 |
| Ex. 14 | 2.6 | 1.5 | 4.1 |
| Ex. 15 | 2.5 | 3.5 | 6.0 |
| Ex. 16 | 1.6 | 2.5 | 4.1 |
| Ex. 17 | 1.6 | 2.9 | 4.5 |
| Ex. 18 | 1.6 | 2.8 | 4.4 |
| Ex. 19 | 2.5 | 2.2 | 4.7 |
| Ex. 20 | 2.2 | 2.8 | 5.0 |
| Ex. 21 | 1.5 | 3.4 | 4.9 |
| Ex. 22 | 1.8 | 4.4 | 6.2 |
| Ex. 23 | 4.5 | 1.5 | 6.0 |

Herein, when the total of $NO_X$ emissions is 4.0 mg/km or less, the catalytic activities are rated good.

As shown in Table 2, for instance, in Examples 1 to 11, the $CeO_2$ content per liter of catalyst volume in their catalyst coating layers is 10 g/L to 30 g/L; and the $CeO_2$ content in the top coating layer's upstream portion is less than the $CeO_2$ content in the top coating layer's downstream portion and in the lower coating layer, respectively. The $CeO_2$ content in the top coating layer's upstream portion is 1/100 to 1/2 times the $CeO_2$ content in the top coating layer's downstream portion. In this case, the total of $NO_X$ emissions is 4.0 mg/km or less. In particular, the $NO_X$ emissions at the time of engine restart is 2.0 mg/km or less. Thus, it is evident that $NO_X$-cleaning activities are good at the time of engine restart in Examples 1 to 11. On the contrary, in Examples 12 and 13 where the $CeO_2$ content per liter of catalyst volume in the catalyst coating layer is outside the range of 10 g/L to 30 g/L, the total of $NO_X$ emissions exceeds 6.0 mg/km. In particular, in Example 12 where the $CeO_2$ content per liter of catalyst volume in the catalyst coating layer is below 10 g/L, the $NO_X$ emissions are high except for at engine restart. This may be because due to the low $CeO_2$ content in the catalyst coating layer, the $NO_X$-cleaning activities had degraded during normal traveling.

In Example 13 where the $CeO_2$ content per liter of catalyst volume in the catalyst coating layer is above 30 g/L, the $NO_X$ emissions are high at restart. Similarly, the $NO_X$ emissions are high at the time of restart also in Example 14 where the $CeO_2$ content in the top coating layer's upstream portion is greater than the $CeO_2$ content in the top coating layer's downstream portion as well as in Example 15 where the $CeO_2$ content in the top coating layer's upstream portion is greater than the $CeO_2$ content in the lower coating layer. This may be because when rich exhaust generated at the time of engine restart reaches the catalyst coating layer in the top coating layer's upstream portion, oxygen stored in the $CeO_2$-containing OSC material (CZ composite oxide) is supplied to the precious metal catalyst, degrading the $NO_X$-reducing activities. In Examples 16 and 17 where the $CeO_2$ content in the top coating layer's upstream portion was not 1/100 to 1/2 times the $CeO_2$ content in the top coating layer's downstream portion, the $NO_X$ emissions were somewhat high especially in the engine restart-free periods. Similarly, in Examples 18 and 19 where the $CeO_2$ content per liter of catalyst volume in the top coating layer's upstream portion was outside the range of 0.1 g/L to 2 g/L, the $NO_X$ emissions were somewhat high in the engine restart-free periods.

In Examples 8 and 9, the length in the exhaust flow direction of the top coating layer's upstream portion accounts for 20% to 75% of the full length in the same direction of the catalyst coating layer from the exhaust entrance-side end; and the length in the exhaust flow direction of the top coating layer's downstream portion accounts for 25% to 80% of the full length from the exhaust exit-side end. In Examples 8 and 9 in such ranges of length, the $NO_X$ emissions were low at the time of engine restart and the total amount of $NO_X$ emissions was below 4.0 mg/km. On the contrary, in Examples 20 and 21 where the length ranges of the top coating layer's upstream and downstream portions were outside these ranges, the total amount of $NO_X$ emissions was above 4.0 mg/km. In particular, the $NO_X$ emissions were high especially in the engine restart-free periods. Accordingly, with the lengths of the upstream and downstream portions of the top coating layer being in these ranges, the $NO_X$-cleaning activities can be increased at the time of engine restart and during normal traveling.

It is evident that even in Example 10 and Example 22 using Pd and Pt for the precious metal catalyst carried by the carrier in the lower coating layer, similar effects can be obtained when the $CeO_2$ content in the top coating layer's upstream portion, top coating layer's downstream portion and the lower coating layer is at a ratio in the aforementioned range As shown in Example 11 and Example 23, it can be seen that even when the exhaust cleaning catalyst has a catalyst coating layer in a three-layer structure, with the $CeO_2$ content being in the aforementioned range in each of the top coating layer's upstream portion, top coating layer's downstream portion and lower coating layer in the catalyst coating layer, similar effects can be obtained.

Although specific embodiments of the present invention have been described in detail above, these are merely for illustrations and do not limit the scope of claims. The invention disclosed herein includes various modifications and changes made to the specific embodiments illustrated above.

REFERENCE SIGNS LIST 1 exhaust cleaning system
2 internal combustion engine (engine)
3 exhaust manifold
4 exhaust pipe
5 ECU
7, 7A exhaust cleaning catalysts
8 pressure sensor
10 substrate (porous substrate)
12 cell(s)
16 partition(s)
30, 30A catalyst coating layers
40, 40A lower coating layers 40a bottom coating layer
40b middle coating layer
50 top coating layer
51 top coating layer's upstream portion
52 top coating layer's downstream portion

The invention claimed is:

1. An exhaust cleaning catalyst placed in an exhaust path from an internal combustion engine to clean exhaust expelled from the internal combustion engine,
the catalyst comprising a porous substrate and a catalyst coating layer formed on the porous substrate,
the catalyst coating layer having a carrier and a precious metal catalyst carried by the carrier,
the carrier comprising an OSC material that includes at least $CeO_2$,
the catalyst coating layer being constituted in its thickness direction with multiple coating layers that includes at least two layers having different compositions, wherein
in its top coating layer forming the uppermost layer that is located at the outermost surface among the multiple coating layers;
the $CeO_2$ content in a top coating layer's upstream portion that includes at least 20% of the full length of the top coating layer from the exhaust entrance-side end along the exhaust flow direction is less than the $CeO_2$ content in a top coating layer's downstream portion that includes at least 20% of the full length of the top coating layer from the exhaust exit-side end along the exhaust flow direction; and
the $CeO_2$ content in the top coating layer's upstream portion is less than the $CeO_2$ content in a lower coating layer that is closer to the porous substrate than the top coating layer is among the multiple coating layers; and
the $CeO_2$ content per liter of catalyst volume in the entire catalyst coating layer is 10 g/L to 30 g/L.

2. The exhaust cleaning catalyst according to claim 1, wherein the $CeO_2$ content in the top coating layer's upstream portion is 1/100 to 1/2 times the $CeO_2$ content in the top coating layer's downstream portion.

3. The exhaust cleaning catalyst according to claim 1, wherein the $CeO_2$ content per liter of catalyst volume in the top coating layer's upstream portion is 0.1 g/L to 2 g/L.

4. The exhaust cleaning catalyst according to claim 1, wherein with the full length of the top coating layer in the exhaust flow direction being 100, the (upstream/downstream) ratio of length of top coating layer's upstream portion along the exhaust flow direction to length of top coating layer's downstream portion along the exhaust flow direction is 20/80 to 75/25.

5. The exhaust cleaning catalyst according to claim 1, wherein the precious metal catalyst is at least one species among Pt, Pd and Rh.

6. The exhaust cleaning catalyst according to claim 5, wherein the top coating layer comprises Pd and Rh as the precious metal catalyst.

* * * * *